(12) United States Patent
Kim

(10) Patent No.: US 6,192,009 B1
(45) Date of Patent: Feb. 20, 2001

(54) INFORMATION RECORDING AND REPRODUCING METHOD AND APPARATUS

(75) Inventor: Dae Young Kim, Seoul (KR)

(73) Assignee: LG Electronics, Inc., Seoul (KR)

( * ) Notice: Under 35 U.S.C. 154(b), the term of this patent shall be extended for 0 days.

(21) Appl. No.: 09/134,349

(22) Filed: Aug. 14, 1998

(30) Foreign Application Priority Data

Aug. 16, 1997 (KR) ................................................ 97-39052

(51) Int. Cl.$^7$ ....................................................... G11B 7/08
(52) U.S. Cl. .................................... 369/44.25; 369/44.26; 369/44.34; 369/58
(58) Field of Search ................................. 369/50, 47, 48, 369/49, 54, 58, 59, 275.4, 275.1, 44.25, 44.26, 44.34

(56) References Cited

U.S. PATENT DOCUMENTS 5,933,410 * 8/1999 Nakane et al. ................ 369/275.4 X

* cited by examiner

Primary Examiner—Muhammad Edun

(57) ABSTRACT

An information recording and reproducing method having a track identification function that is suitable for performing an accurate information record and reproduction for a recording medium including user information areas having any ones of land and groove tracks arranged alternately each other and identification areas having at least one pit stream arranged intersectionally each other at each side on the basis of the center line of the tracks and arranged alternately with the user information area. In the method, a first identification information signal for a pit stream recorded on one side and a second identification information signal for a pit stream recorded on the other side, on the basis of any one center line in tracks, are detected. A judgment as to whether a user information area following the identification area having identification information signals detected is the land or groove track is made in accordance with a sequential relationship of the first and second identification information signals. Any one of access conditions for each of the land and groove tracks is selected in accordance with the judged result and then a information record and reproduction for the user information area is progressed under the selected condition.

24 Claims, 9 Drawing Sheets

INFORMATION RECORDING AND REPRODUCING METHOD AND APPARATUS

BACKGROUND OF THE INVENTION

1. Field of the Invention

This invention relates to a technique for accessing a recording medium that has a track structure of lands and grooves and is divided into an identification area and a user information area, and more particularly to an information recording and reproducing method and apparatus wherein the track and/or the areas is identified by an information on the identification area and the information record and reproduction is performed depending upon the identified result.

2. Description of the Prior Art

Recently, there have been developed and prevalent various types of recording media to record as much information as possible. For example, in a digital versatile disc(DVD), a width of track and a distance between tracks, that is, a track pitch, etc. are reduced compared with the existing compact disc(CD) so as to record more information.

In a recording medium such as an optical disc, a track is defined by the land and groove pattern to perform an accurate information record and reproduction including an effective tracking. The optical disc having such land and groove tracks can be classified into an optical disc in which an information is recorded only on the groove track and an optical disc in which an information is recorded on both the land track and the groove track. Typically, the latter optical disc has a two spiral track structure in which the land and groove tracks are formed in parallel in the spiral pattern from the innermost circumference to the outermost circumference. In an optical disc having such a two spiral track structure, typically, the record and reproduction (i.e., an excess operation) is performed for any one of the land and groove tracks and, thereafter, performed for the remainder track. Alternatively, there exist an optical disc having an one spiral track structure in which the land and groove tracks are alternately arranged every rotation.

A track of the recording medium such as optical disc is divided into a certain size of unit regions, hereinafter referred to as "sectors", to record an information in a certain size of block unit. The sector consists of a preceding ID area and a user information area following the ID area. The user information area is called "recording area" because an information desired by a user is recorded in this area. The ID area is recorded with an ID code indicating a physical position of the track.

FIG. 1 shows an optical disc in which an ID area and a user information area are formed in a different pattern and the user information area is defined by land and groove tracks. An example of such an optical disc is disclosed in Japanese laid-open patent gazette no. Pyung 9-221821. In the disc as shown in FIG. 1, land tracks 1 and groove tracks 2 are alternately arranged in the diameter direction. All the land and groove tracks 1 and 2 are used as the user information area that permits a user to record a desired information. Further, the land and groove tracks 1 and 2 are alternately arranged in the circumference direction of the disc along with a certain length of embossed pit stream 3 and 4. The certain length of embossed pit stream 3 and 4 divides the land and groove tracks 1 and 2 in a number of sectors and indicates the physical position of the sectors. Accordingly, a region occupied by the embossed pit stream 3 and 4 is referred to as "ID area". The embossed pit stream 3 and 4 consist of the first pit stream 3 and the second pit stream 4. The first pit stream 3 is defined on the upper side with respect to the center line of the land track 1, and the second pit stream 4 is defined on the lower side with respect to the center line of the land track 1. Since the first pit stream 3 includes an identification code indicating the physical position of the land track 1, a region occupied by the first pit stream 3 is referred to as a land ID area. Likewise, since the second pit stream 4 includes an ID code indicating the physical position of the groove track 2, a region occupied by the second pit stream 4 is referred to as a groove ID area. Each side of the land and groove tracks 1 and 2 may be formed in a linear line as shown in FIG. 1, or may be formed in a wobbled pattern having a certain period so as to indicate a rotation speed of a disc and a tracking of a light beam. In other words, a wobbling signal may be preformatted at each side of the land and groove tracks 1 and 2. This wobbling signal may include a carrier signal in which a specified information such as an address indicating the physical position of a disc is frequency modulated.

In order to access an optical disc having tracks formed in the land and groove pattern, a light beam must trace the center of the land and groove tracks accurately. To this end, a light beam must be controlled differently depending upon the land or groove track. Accordingly, a tracking servo controlling a tracking of a light beam must quickly and accurately determine whether a track at which a light beam is positioned is the land track or the groove track.

Likewise, in order to accurately access an optical disc in which the user area and the ID area are defined in a different pattern, an ID code preformatted on the ID area must be accurately detected in a method different from an information recorded in the user area. To this end, a tracking servo must control a tracking of a light beam differently depending upon the user area and the ID area. Accordingly, the tracking servo must quickly and accurately identify the ID area and the user area.

SUMMARY OF THE INVENTION

Accordingly, it is an object of the present invention to provide an information recording and reproducing method and apparatus having a track identification function that is adapted to identify land and groove tracks defined in a recording medium quickly and accurately.

Another object of the present invention is to provide an information recording and reproducing method and apparatus having a track identification function that is adapted to identify a user area and an ID area formed in a different pattern.

Still another object of the present invention is to provide an information recording and reproducing method and apparatus having a track identification function that is adapted to accurately access a recording medium in which land and groove tracks are formed.

Still another object of the present invention is to provide an information recording and reproducing method and apparatus that is adapted to accurately access a recording medium having a user area and an ID area formed in a different pattern.

In order to achieve these and other objects of the invention, an information recording and reproducing method according to one aspect of the present invention includes the steps of detecting identification information signals for a plurality of pit streams from a recording medium including user information areas having any ones of land and groove tracks arranged alternately each other and identification areas having the plurality of pit streams arranged asymmetrically at each side on the basis of the center line of the tracks, the identification areas being alternately arranged with the user information areas; determining whether a user information area following the identification area is a land track or a groove track in accordance with a sequential relationship of the identification information signals; and selecting any one of access conditions for each of the land and groove tracks in accordance with the determined result and performing a record and reproduction of information for the user information area under the selected condition.

An information recording and reproducing method according to another aspect of the present invention includes the steps of detecting an identification information signal for at least one pit stream from a recording medium including user information areas having any ones of land and groove tracks arranged alternately each other and identification areas having at least one pit stream, the identification areas being alternately arranged with the user information areas; determining any one of the identification area and the user information area depending upon whether or not a predetermined logic value is set, the predetermined logic value being only established when the identification information signal is detected; and performing a record and reproduction of information for the user information area in accordance with the determined result.

An information recording and reproducing method according to still another aspect of the present invention includes (A) detecting identification. information signals for a plurality of pit streams from a recording medium including user information areas having any ones of land and groove tracks arranged alternately each other and identification areas having the plurality of pit streams arranged asymmetrically at each side on the basis of the center line of the tracks, the identification areas being alternately arranged with the user information areas; (B) determining any one of the identification area and the user information area depending upon whether or not a predetermined logic value is set, the predetermined logic value being only established when the identification information signal is detected; (C) determining whether a user information area following the identification area is a land track or a groove track in accordance with a sequential relationship of the identification information signals; and (D) selecting any one of access conditions for each of the land and groove tracks in accordance with the determined result in the step (C) and performing a record and reproduction of information for the user information area in accordance with the determined result in the step (B) under the selected condition.

An information recording and reproducing apparatus according to still another aspect of the present invention includes detecting means for detecting identification information signals for a plurality of pit streams from a recording medium including user information areas having any ones of land and groove tracks arranged alternately each other and identification areas having the plurality of pit streams arranged asymimetrically at each side on the basis of the center line of the tracks, the identification areas being alternately arranged with the user information areas; track determining means for determining whether a user information area following the identification area is a land track or a groove track in accordance with a sequential relationship of the identification information signals detected by the detecting means; and recording/reproducing means for setting to any one of access conditions for each of the land and groove tracks in accordance with the determined result and performing a record and reproduction of information for the user information area under the set access condition.

An information recording and reproducing apparatus according to still another aspect of the present invention includes detecting means for detecting an identification information signal for at least one pit stream from a recording medium including user information areas having any ones of land and groove tracks arranged alternately each other and identification areas having at least one pit stream, the identification areas being alternately arranged with the user information areas; area determining means for determining any one of the identification area and the user information area depending upon whether or not a predetermined logic value is set, the predetermined logic value being only established when the identification information signal is detected; and recording/reproducing means for performing a record and reproduction of information for the user information area in accordance with an output signal of the area determining means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 2:
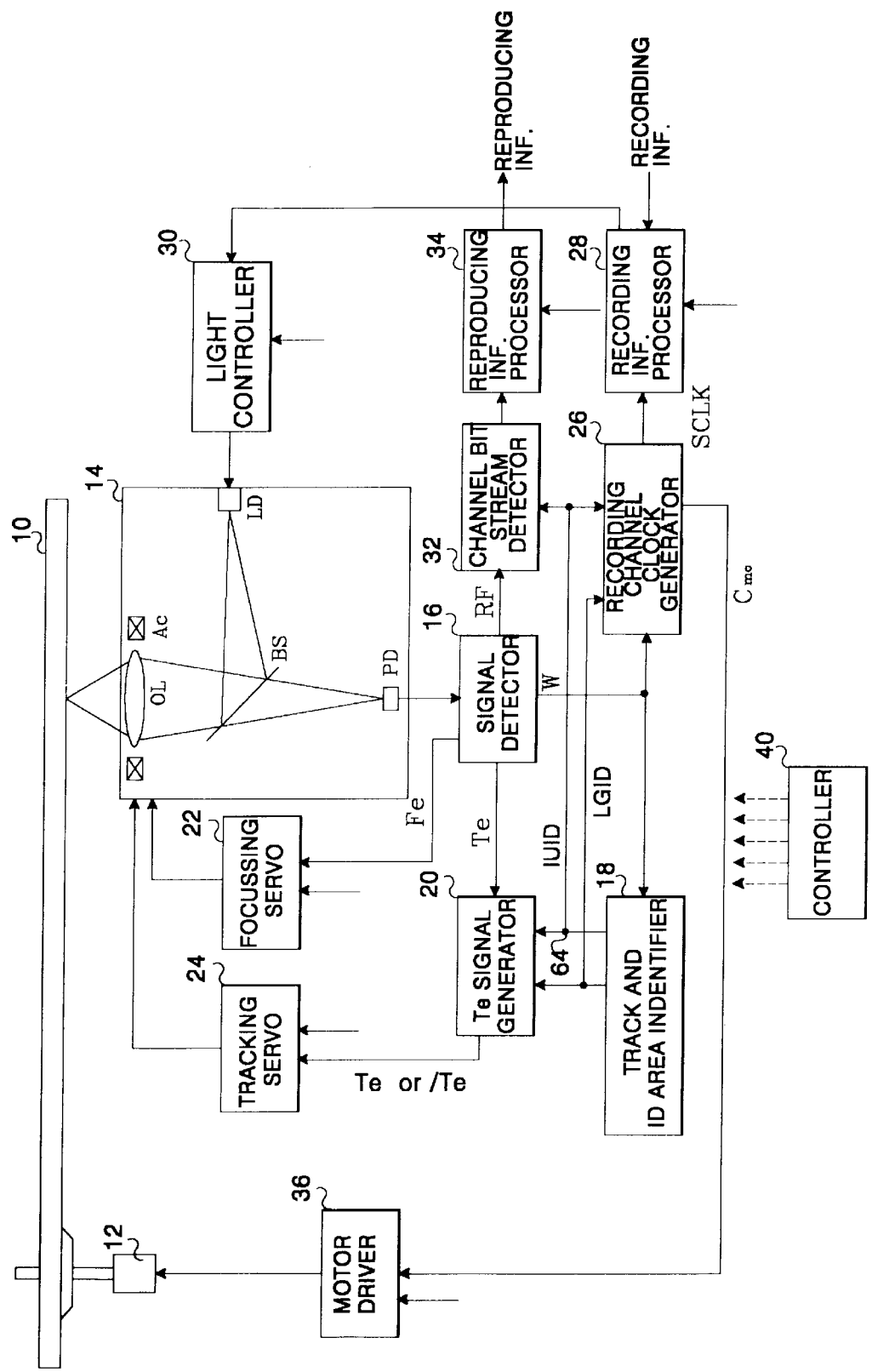
FIG. 2 is a block diagram of an information recording and reproducing apparatus according to an embodiment of the present invention.

Referring to FIG. 2, there is shown an information recording and reproducing apparatus according to an embodiment of the present invention. The information recording and reproducing apparatus includes a spindle motor 12 for rotating an optical disc 10, an optical pickup 14 for optically accessing the optical disc 10, and a signal detector 16 and a track and area identifier 18 that are connected in series to the optical pickup 14. The optical pickup 14 irradiates a light beam on land and groove tracks of the optical disc 10, thereby writing an information onto the signal tracks or reading the information written onto the signal tracks. To this end, the optical pickup 14 includes a beam splitter BS for guiding a light beam from a laser diode LD to an objective lens OL and guiding a light beam from the objective lens OL to a photo detector PD, and an actuator Ac for moving the objective lens OL in the up, down, left and right direction to perform a focusing and a tracking. The objective lens OL converges a light beam progressing form the beam splitter BS to the optical disc 10. The beam splitter BS allows a light beam from the laser diode LD to be irradiated onto the signal tracks of the optical disc 10 by way of the objective lens OL and, simultaneously, allows a light beam reflected by the optical disc 10 to be progressed toward the photo detector PD. The actuator Ac moves the objective lens OL in the up and down direction in such a manner that a light beam falls within a focus region in the land or groove track. Also, the actuator AC moves the objective lens OL in the left and right direction in such a manner that a light beam travels a center line of the land or groove track. The photo detector PD converts a light quantity received, via the objective lens OL and the beam splitter BS, from the optical disc 10 into an electrical signal. The photo detector PD consists of four light detecting pieces so that a distributed state of a light irradiated onto the signal tracks can be detected. The signal detector 16 detects a focusing error signal Fe, a tracking error signal Te, a radio frequency signal RF and a pushpull signal W that are included in an output signal of the optical pickup 14. The focusing error signal Fe and the tracking error signal Te are signals concerning a distributed state of a light beam irradiated onto the land or groove signal track. In order to detect the focusing error signal Fe, the tracking error signal Te, the radio frequency signal RF and the pushpull signal W, the signal detector 16 is configured as shown in FIG. 3.

Figure 1:
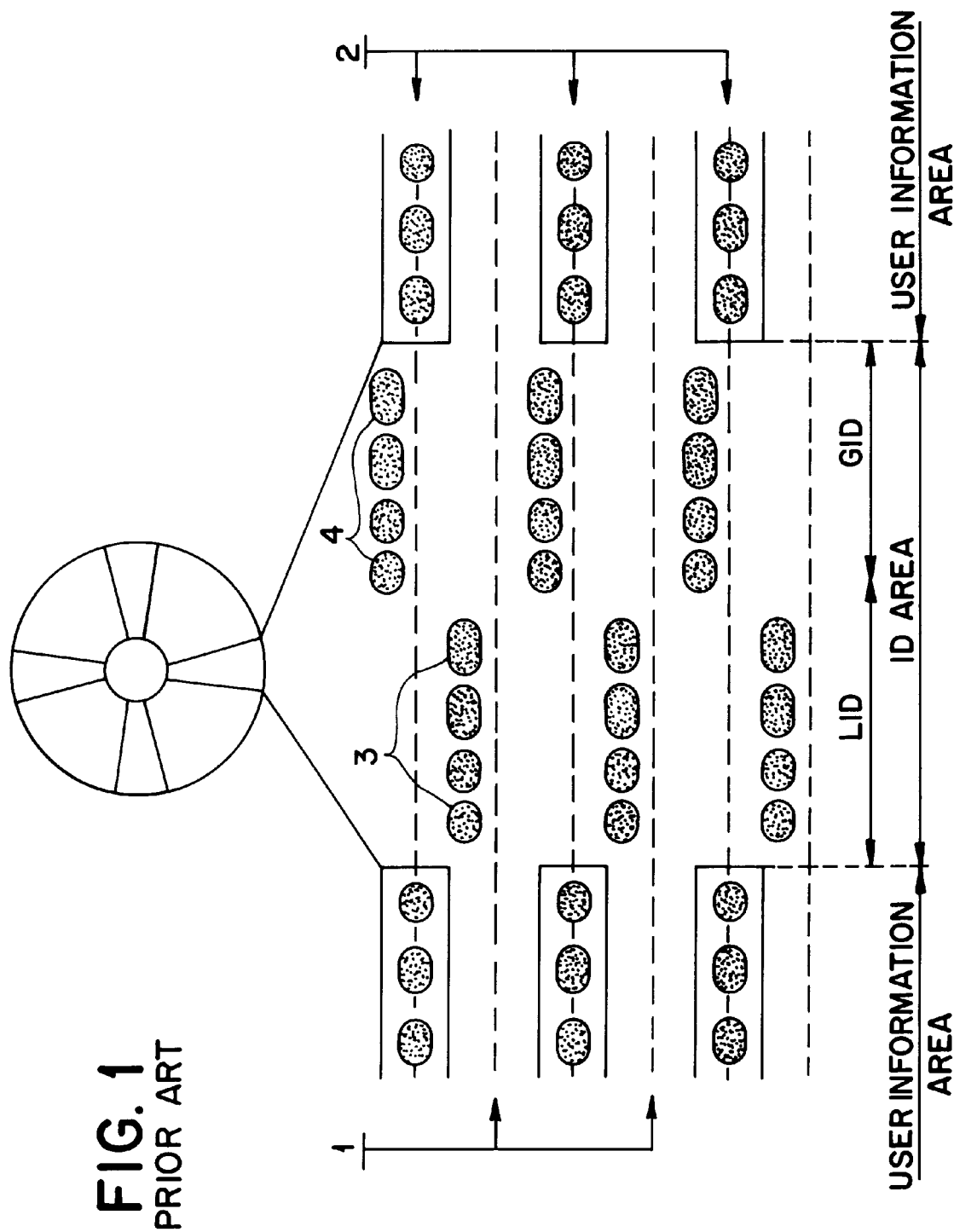
FIG. 1 is a schematic view showing the structure of a recording medium including an identification area and a user information area having a land and groove track structure.
Figure 3:
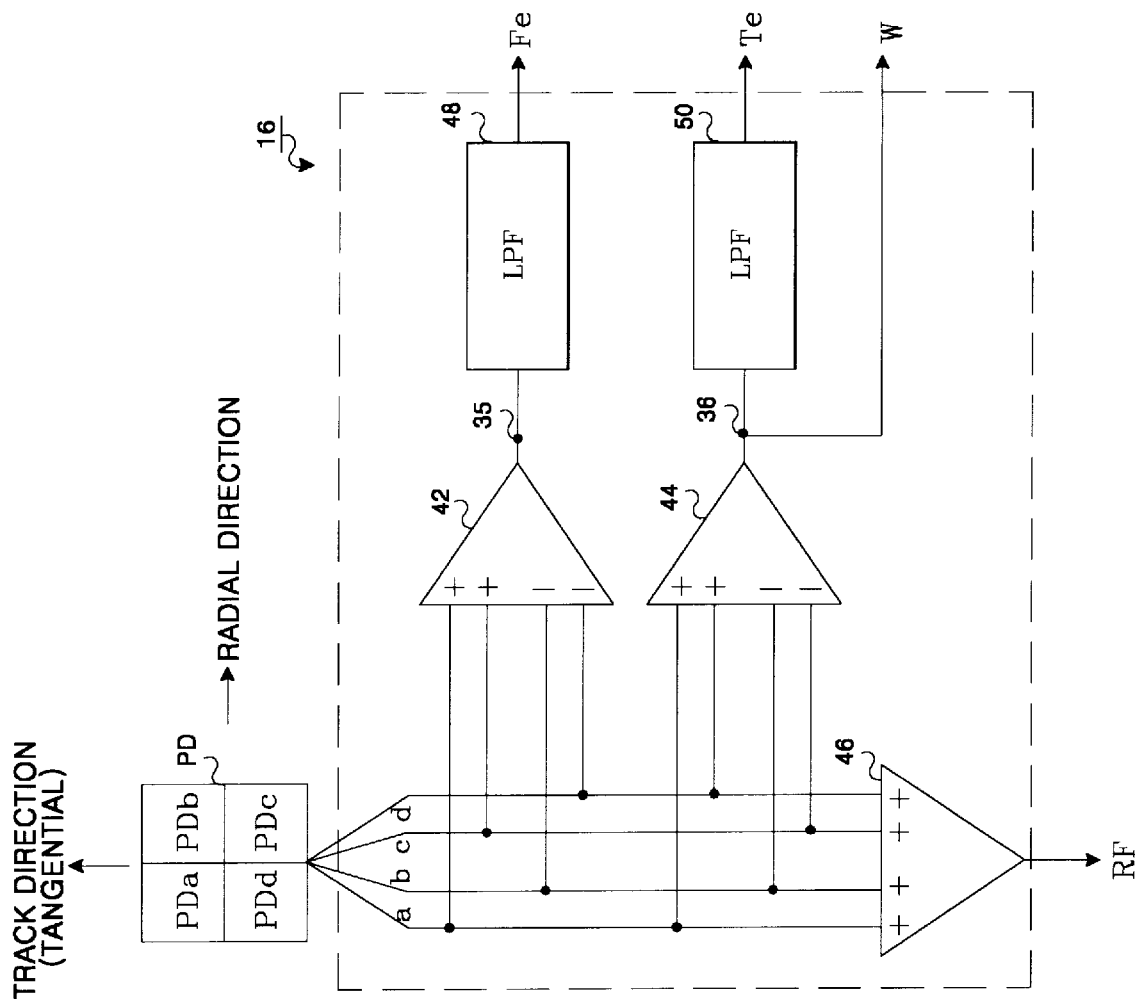
FIG. 3 is a detailed block diagram of the signal detector shown in FIG. 2.
Figure 4:
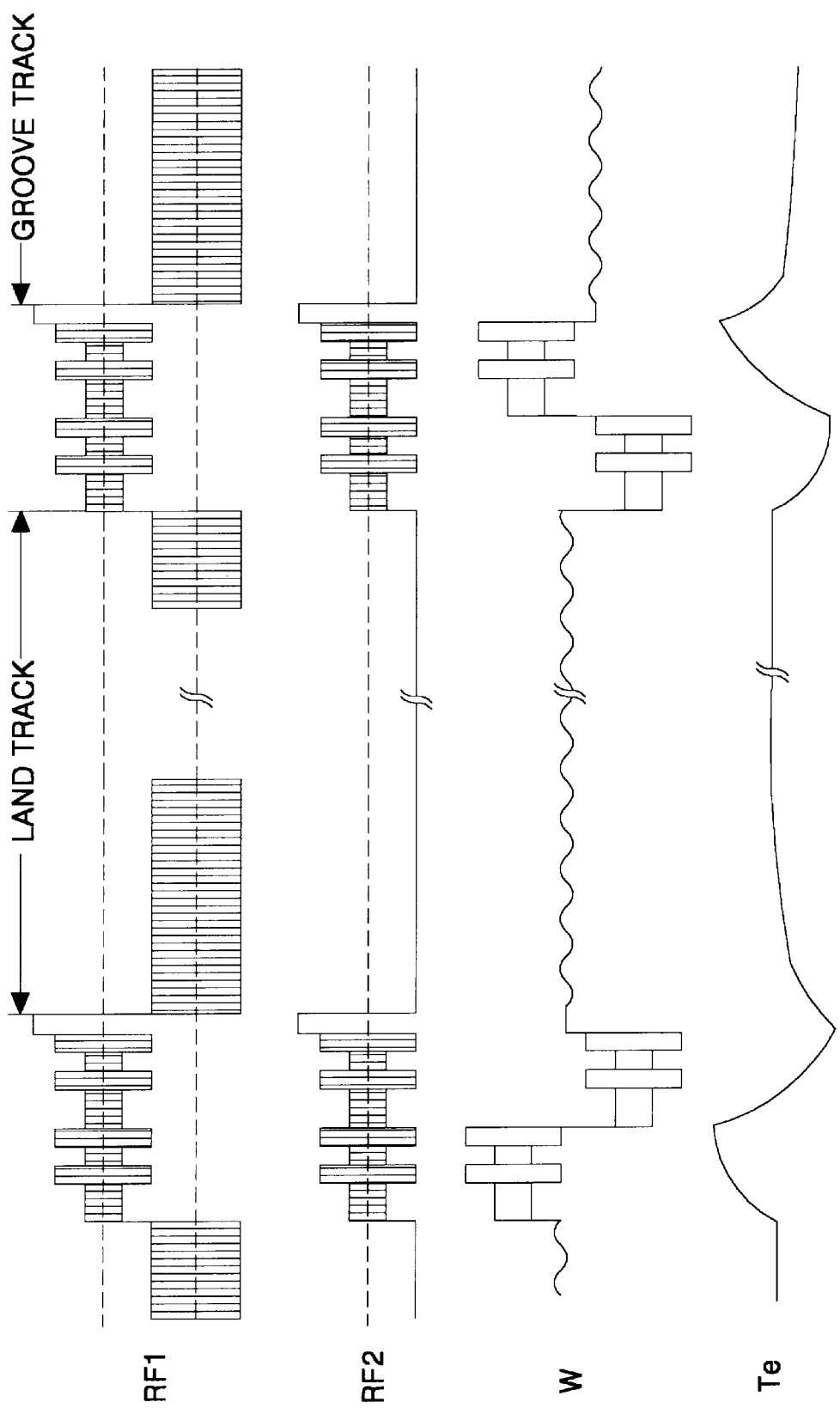
FIG. 4 is an operational waveform diagram of each part of the signal detector shown in FIG. 3.

Referring to FIG. 3, the signal detector 16 includes first to third adder amplifiers 42, 44 and 46 connected in parallel to a four divisional. photo detector PD, and first and second lowpass filter 48 and 50 connected to the first and second adder amplifiers 42 and 44, respectively. The first adder amplifier 42 differentially amplifies a sum signal a+c of electrical signals a and C that are generated at two light detecting pieces PDa and PDc of the four divisional photo detector PD and applied to each non-inverting terminal(+) thereof and a sum signal b+d of electrical signals b and d that are generated at the remaining light detecting pieces PDb and PDd and applied to each inverting terminal(−) thereof. The first lowpass filter 48 eliminates a radio frequency noise signal included in an output signal from the first adder amplifier 42 to generate the focus error signal Fe. The second adder amplifier 44 differentially amplifies a sum signal a+d of electrical signals a and d that are generated at two light detecting pieces PDa and PDd of the four divisional photo detector PD and applied to each non-inverting terminal(+) thereof and a sum signal b+c of electrical signals b and c that are generated at the remaining two photo detecting pieces PDb and PDc and applied to each inverting terminal(−) thereof, thereby generating a pushpull signal W. As shown in FIG. 4, the pushpull signal W output from the second adder amplifier 44 includes a track wobbling signal of the user information area and an ID information signal recorded on the ID area in a prepit form. It is seen from FIG. 4 that the pushpull signal W has a contrary waveform at the time of access of the land track and the groove track. This stems from the structure of the ID area in FIG. 1. The second lowpass filter 50 filters a low frequency component included in the pushpull signal W from the second differential amplifier 44 to a tracking error signal as shown in FIG. 4. The third adder amplifier 46 additionally amplifies electrical signals a, b, c and d generated from four light detecting pieces PDa, PDb, PDc and PDd of the photo detector PD to generate a radio frequency signal RF. The radio frequency signal RF output from the third adder amplifier 46 includes an ID information recorded on the ID area and a user information recorded on the user information area and which has an waveform of RF1 or RF2 in FIG. 4. The RF1 represents a radio frequency signal waveform when a user information is recorded on the user information area; while the RF2 represents a radio frequency signal waveform when a user information is not recorded on the user information area.

Returning to FIG. 2, the track and area identifier 18 performs an identification of the land and groove tracks and an identification of the ID area and the user information area based on the pushpull signal W output from the signal detector 16. To this end, the track and area identifier 18 is configured as shown in FIG. 5.

Figure 5:
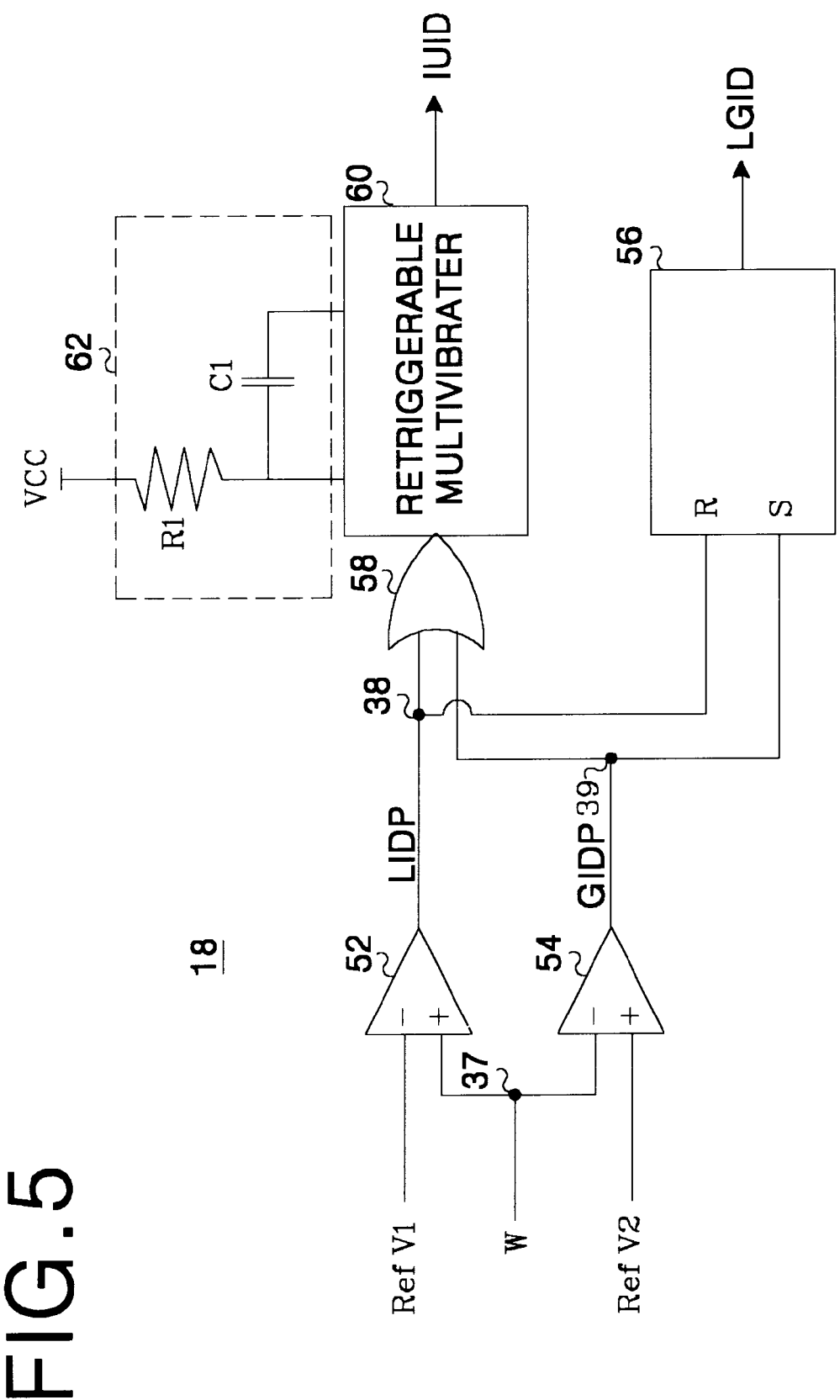
FIG. 5 is a detailed block diagram of a track and area identifier shown in FIG. 2.
Figure 6:
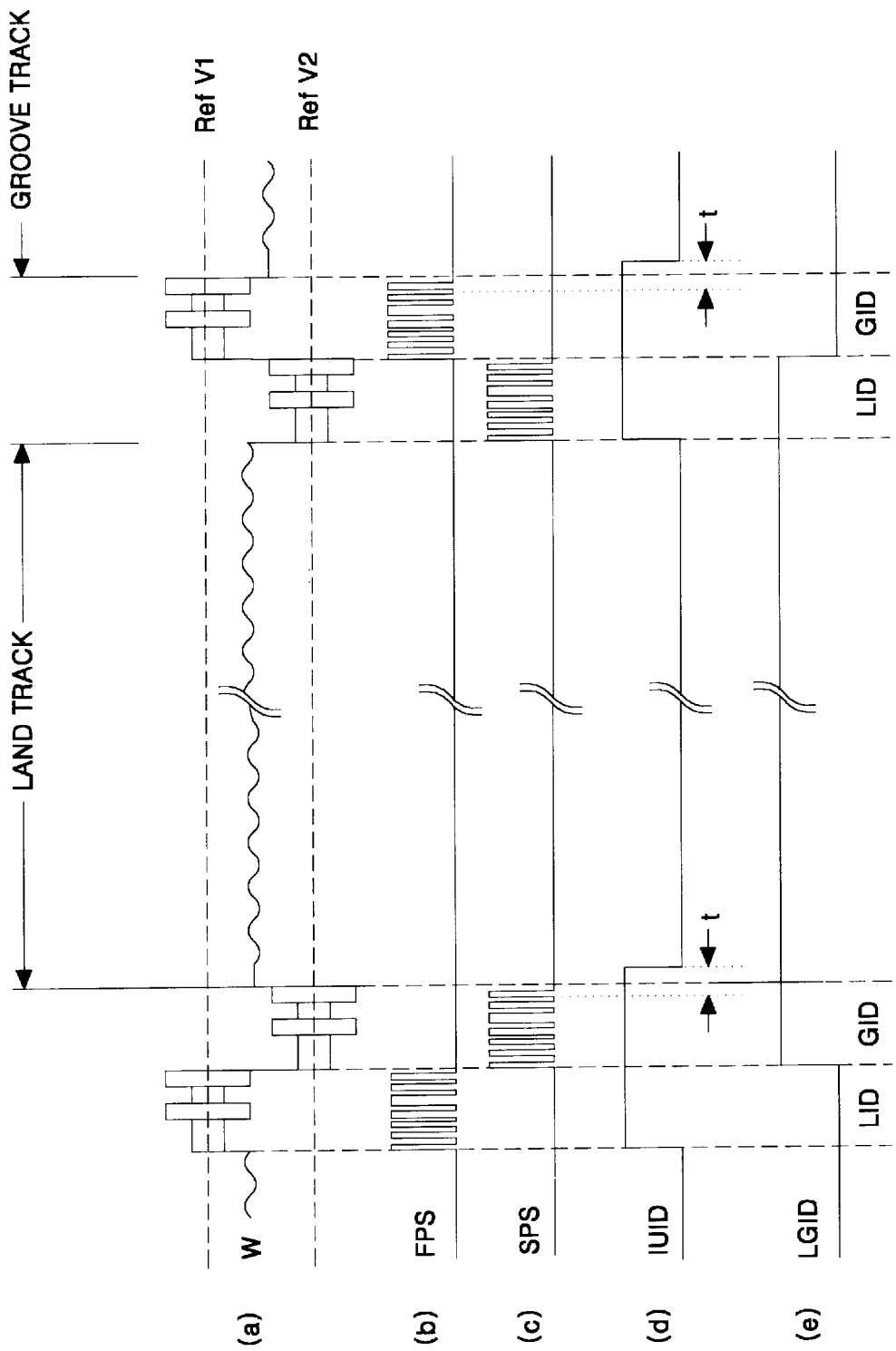
FIG. 6 is an operational waveform diagram of each part of the track and area identifier shown in FIG. 5.

Referring now to FIG. 5, the track and area identifier 18 includes first and second comparators 52 and 54 for receiving the pushpull signal W output from the signal detector 16, and a RS flip-flop 56 for generating a track identification signal from output signals of the first and second comparators 52 and 54. The first comparator 52 compares the pushpull signal W input to the non-inverting terminal(+) thereof with a first predetermined reference value RefV1 to output a difference signal. The second comparator 54 compares the pushpull signal W input to the inverting terminal (−) thereof with a second predetermined reference value RefV2 to output a difference signal. As shown in FIG. 6, the first and second reference values RefV1 and RefV2 are preset to correspond to zero-crossing levels of signals detected in a LID area and a GID area, respectively. The first comparator 52 outputs a high logic value when a pushpull signal W higher than the first reference value RefV1 is detected, thereby generating a first pulse signal FPS corresponding to an embossed pit stream on the LID area as shown in FIG. 6. The second comparator 54 outputs a high logic value when a pushpull signal W lower than the second reference value RefV2 is detected, thereby generating a second pulse signal SPS corresponding to an embossed pit stream on the GID area as shown in FIG. 6. Output signals FPS and SPS of the first and second comparators 52 and 54 are applied to a reset terminal R and a set terminal S, respectively, to generate a track identification signal LGID at the RS flip-flop 56 as shown in FIG. 6. In other words, when a user information area following the ID area being currently accessed, that is, a user information area in a sector to be accessed is the land track, the first pulse signal FPS generated at the first comparator 52 is firstly input to the reset terminal R of the RS flip-flop 56, and then the second pulse signal SPS generated at the second comparator 54 is input to the set terminal S of the RS flip-flop 56. In this case, the RS flip-flop 56 generates a track identification signal LGID maintaining a high logic after the ID area as shown in FIG. 6. On the contrary, when a user information area to be accessed is the groove track, the second pulse signal SPS generated at the second comparator 54 is firstly input to the set terminal S of the RS flip-flop 56, and then the first pulse signal FPS is applied to the reset terminal R of the RS flip-flop 56. Accordingly, the RS flip-flop 56 generates a track identification signal LGID maintaining a low logic after the ID area as shown in FIG. 6. As a result, the RS filp-flop 56 generates a track identification signal LGID having a high logic when the land track is accessed; while generating a track identification LGID having a low logic when the groove track is accessed.

The track and area identifier 18 further includes an OR gate 58 for receiving output signals of the first and second comparators 52 and 54, a retriggerable multivibrater 60 for receiving an output signal of the OR gate 58, and a time constant circuit 62 connected to the retriggerable multivibrater 60. The OR gate 58 makes a logical sum operation of the output signals FPS and SPS of the first and second comparators 52 and 54 and outputs it to the retriggerable multivibrater 60. The retriggerable multivibrater 60 generates a certain width of monostable pulse whenever a pulse is received from the OR gate 58. The time constant circuit consisting of a resistor R1 and a capacitor C1 determines a width of the monostable pulse generated at the retriggerable multivibrater 60. To this end, the resistor R1 and the capacitor C1 is set to appropriate resistance and capacitance in such a manner that a time constant π=RC corresponds to the width of the monostable pulse generated at the retriggerable multivibrater 60. For example, since a length of greatest pit is 14T in the case of DVD, it is desirable that a value of the resistor R1 and a value of the capacitor C1 are set such that the time constant π=RC becomes larger than 14T. The retriggerable multivibrater 60 generates an area identification signal IUID remaining at a high logic during an interval when a pulse stream is applied from the OR gate 58, that is, during an interval when a light beam is irradiated onto the ID area with the aid of the time constant circuit 62. As a result, the track and area identifier 18 generates a track identification signal LGID that remains at a high logic when the land track is accessed while remaining at a low logic when the groove track is accessed, and an area identification signal IUID that remains at a high logic in the ID area and at a low logic in the user information area.

Returning to FIG. 2 again, the information recording and reproducing apparatus further includes a tracking error signal generator 20 connected, in parallel, to the signal detector 16, and a focusing servo 22. The tracking error signal generator 20 is responsive to the area identification signal IUID to sample and hold a tracking error signal Te or /Te to be transferred to the tracking servo 24. In other words, the tracking error signal generator 20 holds the previous tracking error signal Te or /Te detected at the user information area in the ID area because the ID area does not have two non-symmetrical sides unlike the track, that is, the user information area. Specifically, the tracking error signal generator 20 applies the previously sampled tracking error signal Te to the tracking servo when a high logic of ID area identification signal IUID is applied from the track and area identifier 18; while it samples a tracking error signal Te applied from the signal detector 16 and outputs the sampled signal to the tracking servo when a low logic of area information signal indicating the user information area is applied from the track and area identification signal. Further, the tracking error signal generator 20 is responsive to the track identification signal LGID output from the track and area identifier 18 to selectively invert the tracking error signal Te. In other words, it inverts the tracking error signal Te selectively depending upon whether a track being currently accessed is the land track or the groove track. This will be apparent from FIG. 8 that represents a variation of the tracking error signal Te in the diameter direction of the disc.

Figure 7:
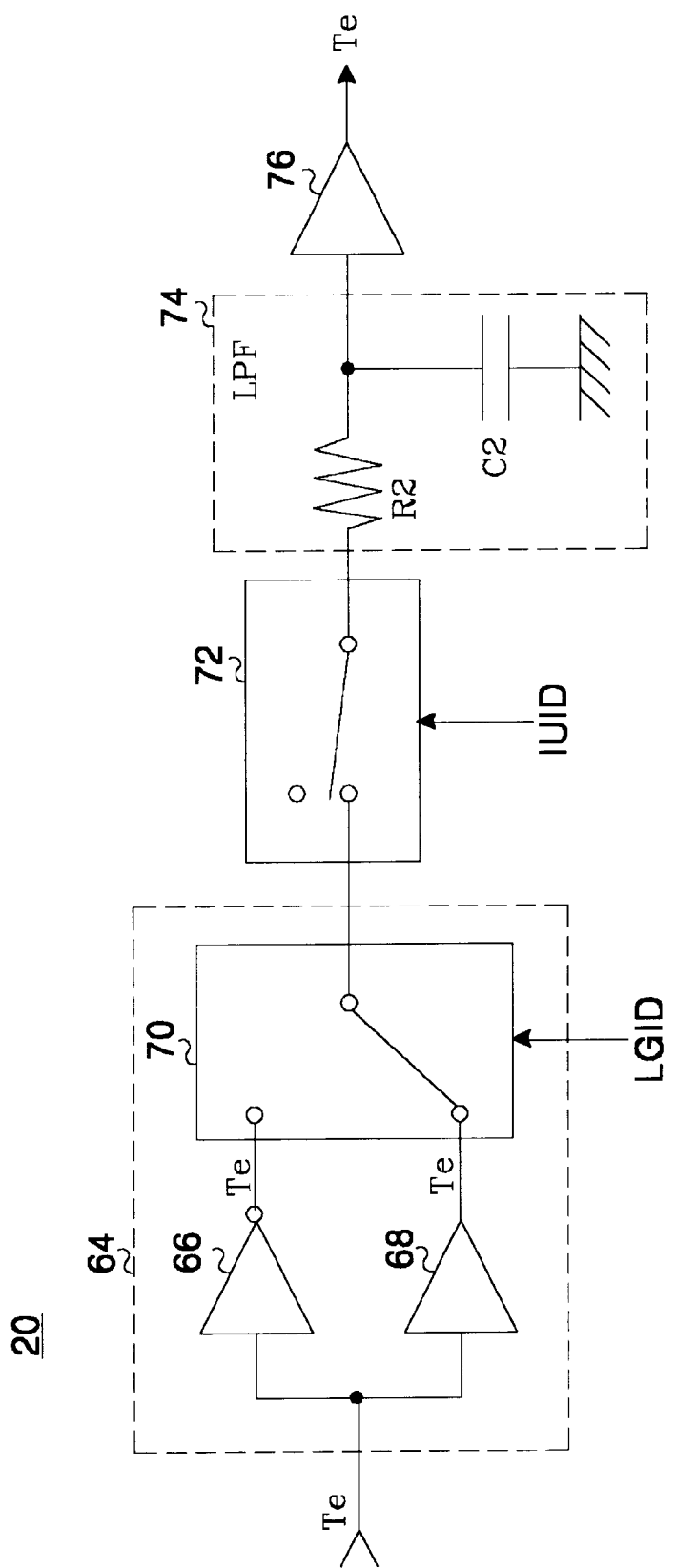
FIG. 7 is a detailed circuit diagram of the tracking error signal generator shown in FIG. 2.
Figure 8:
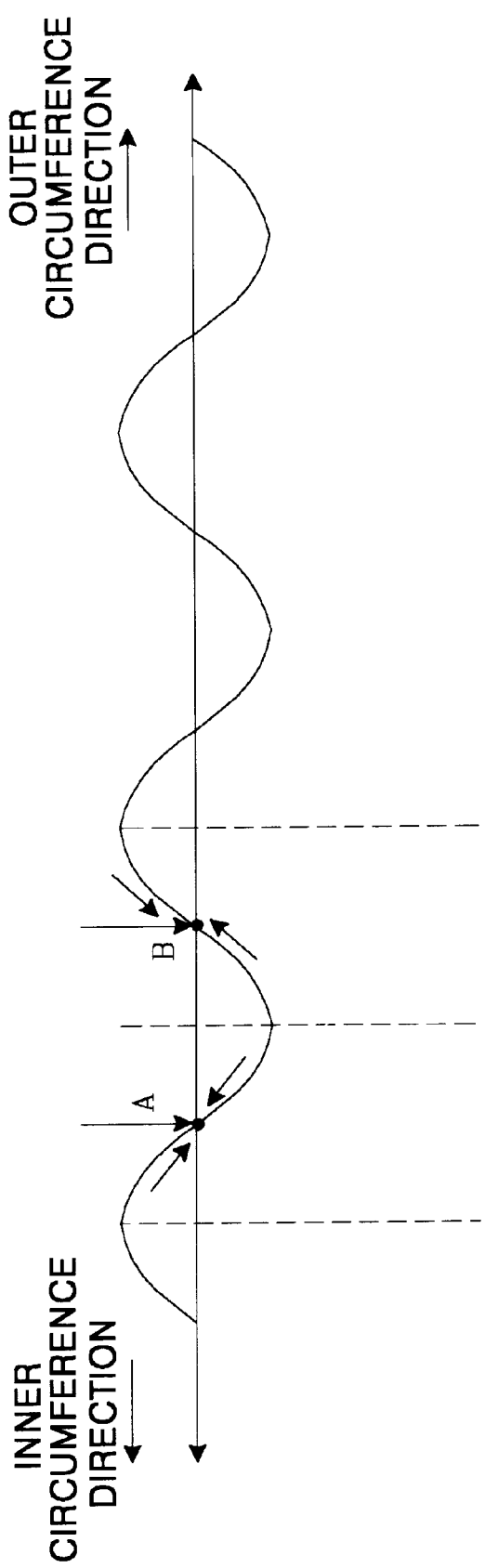
FIG. 8 is a waveform diagram of a track error signal in the diameter direction of a recording medium.

In FIG. 8, in the case where the tracking error signal Te has a positive value(+) whan a groove track having a center line of A is traced, a tracking servo operation must be performed in such a manner that a light beam is moved in the outer circumference direction of the disc. On the other hand, in the case where the tracking error signal Te has a positive value(+) when a land track having a center line of B is traced, the tracking servo operation must be performed in such a manner that a light beam is moved in the inner circumference direction. In order to perform such a function, the tracking error signal generator 20 is configured as shown in FIG. 7.

Referring now to FIG. 7, the tracking error signal generator 20 includes a polarity switching circuit 64 responding to the track identification signal LGID from the track and area identifier for selectively inverting the first tracking error signal Te from the signal detector 16, a switch 72 responding to the area identification signal IUID from the track and area identifier 18 to perform a sample and hold operation, a lowpass filter 74 connected, :in series, to the switch 72, and a second buffer 76. The polarity switching circuit 64 outputs the tracking error signal Te from the signal detector 16 as it is when the track identification signal LGID indicates the land track (or the groove track); while outputting the inverted tracking error signal /Te when the track identification signal LGID indicates the groove track (or the land track). To this end, the polarity switching circuit 64 includes an inverter 66 and a first buffer 68 for commonly receiving the tracking error signal Te, and a selection switch 70 responding to the track identification signal LGID for selectively connecting the inverter 66 and the first buffer 68 to the switch 72. The selection switch 70 connects the first buffer 68 to the switch 72 when the track identification signal LGID remains at a high logic state, that is, when an accessed signal track is the land track. Accordingly, the tracking error signal Te buffered by means of the first buffer 18 is applied, via the selection switch 70, to the switch 72 as it is. On the other hand, the selection switch 70 connects the inverter 66 to the switch 72 when the track identification signal LGID remains at a low logic state, that is, when an accessed signal track is the groove track. Accordingly, the tracking error signal /Te inverted by the inverter 66 is applied, via the selection switch 70, to the switch 72. In this case, the selection switch 70 performs a switching operation in a time point when a logical state of the track identification signal LGID changes, that is, in an edge region. The switch 72 is responsive to the area identification signal IUID from the track and area identifier 18 Lo perform a sample and hold operation. Specifically, when the area identification signal IUID is a high logic state, that is, when the ID area is accessed, the switch 72 is opened to hold an output signal of the polarity switching circuit with the aid of the lowpass filter 74. On the other hand, when the area identification signal IUID is a low logic state, that is, when the user information area is accessed, the switch 72 connects the polarity switching circuit 64 to the lowpass filter 74, thereby allowing an output signal of the polarity switching circuit to be sampled by means of the lowpass filter 74. The lowpass filter 74 consisting of a resistor R2 and a capacitor C1 integrates the tracking error signal Te or /Te from the switch 72 to generate a averaged tracking error signal Te or /Te. The second buffer 76 buffers the averaged tracking error signal Te or /Te from the lowpass filter 74 and outputs the buffered tracking error signal Te or /Te.

The focusing servo 22 in FIG. 2 is responsive to the focusing error signal Fe output from the signal detector 16 to control a current signal or a voltage signal applied to the actuator Ac, thereby moving the objective lens OL in the up and down direction in such a manner that a light beam falls within a focus region. The tracking servo 24 is responsive to the tracking error signal Te or /Te form the tracking error signal generator 20 to control a current signal or a voltage signal applied to the actuator Ac, thereby moving the objective lens OL in the left and right direction in such a manner that a light beam traces the center line of the track.

Moreover, the information recording and reproducing apparatus includes a channel bit stream detector 32 and a reproducing information processor 34 that are connected, in series, to the signal detector 16, and a recording channel clock generator 26, a recording information processor 28 and a light controller 30 that are connected, in series, between the signal detector 16 and the laser diode LD within the optical pickup 14. The channel bit stream detector 32 detects bit stream of the ID information and the user information from a radio frequency signal RF of the signal detector 16 with the aid of the area identification signal IUID output from the track and area identifier 18. In other words, the channel bit stream detector 32 is responsive to the area identification signal IUID from the track and area identifier 18 to switch a zero crossing level corresponding to the subject: area and compare the zero crossing level with the radio frequency signal RF, thereby detecting the bit stream of the ID information and the user information. The reproducing information processor 34 reconstructs a bit stream detected by means of the channel bit stream detector 32 to reproduce a user information recorded on the user information area (i.e., the signal track). In this case, a bit stream for the ID information output from the channel bit stream detector 32 is used as a reference information in reconstructing the user information. The user information reproduced using the reproducing information processor 34 is output in a type of digital signal or analog signal. The channel bit stream detector 32 and the reproducing information processor 34 as described above is used only during the reproduction.

The recording channel clock generator 26 is responsive to track and area identification signals LGID and IUID output from the track and area identifier 18 to detect a channel clock SCLK serving as a reference upon recording from a wobbling component included in the pushpull signal W output from the signal detector 16 and a rotation speed of the optical disc 10. In this case, since the recording channel clock generator 26 requires only a wobbling component for the user information area, it detects only the wobbling component with the aid of the area identification signal IUID output from the track and area identifier 18. Also, the recording channel clock generator 26 selectively inverts a polarity of the wobbling component detected in accordance with the track identification signal LGID output from the track and area identifier 18 because a wobbling component for the land track adjacent to the user information area and a wobbling component from the groove track have an inverted phase to each other. In order to perform such a function, the recording channel clock generator 26 is configured as shown in FIG. 9.

Figure 9:
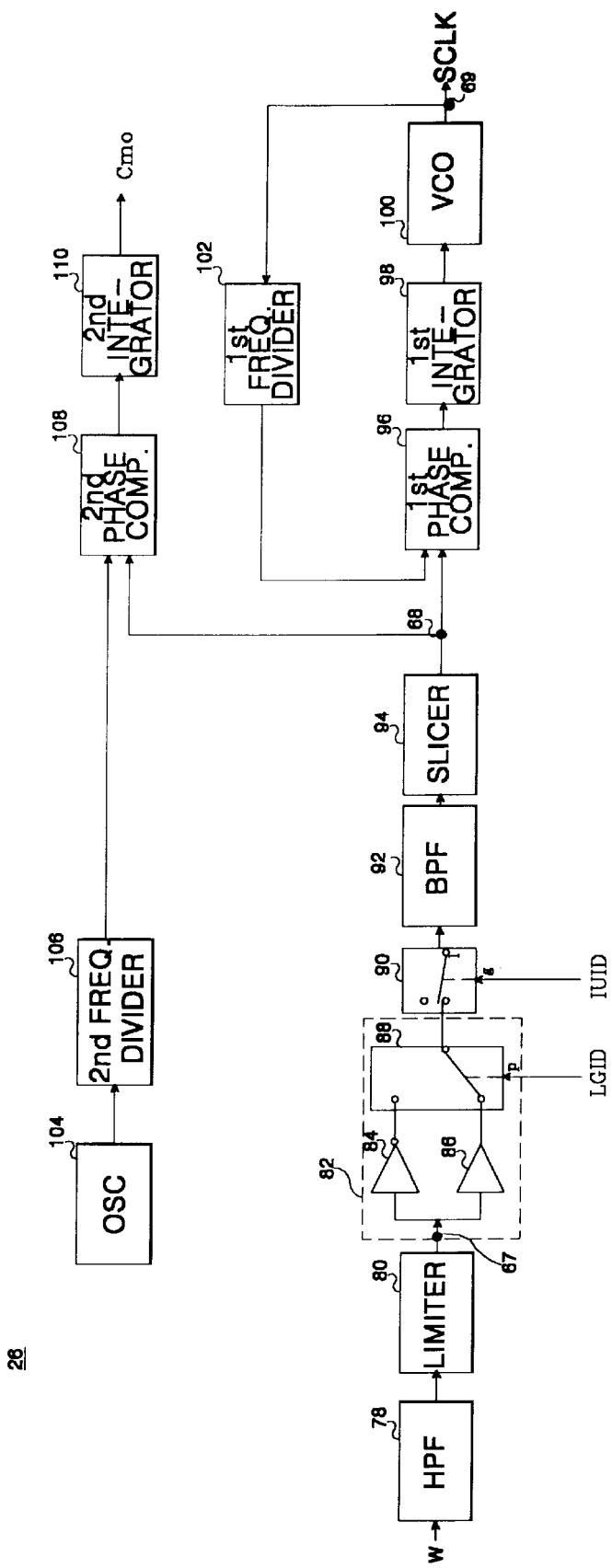
FIG. 9 is a detailed circuit diagram of a recording channel clock generator shown in FIG. 2.

Referring to FIG. 9, the recording channel clock generator 26 includes a highpass filter 78, a limiter 80, a second polarity switching circuit 82, a second switch 90 and a slicer 94 that are connected to the signal detector 16 in FIG. 2 in series. The pushpull signal W output from the signal detector 16 are level-limited by means of the limiter 80 after being filtered using the highpass filter 78 to eliminate an ID information signal included in the pushpull signal W. An output signal of the limiter 80 is applied to a second inverter 84 and a third buffer 86 in the second polarity switching circuit 82. A second selection switch 88 of the second polarity switching circuit 82 responds to the track identification signal LGID received from the track and area identifier 18 to connect the second inverter 84 or the third buffer 86 to the second switch 90 selectively. More specifically, when the track identification signal LGID has a low logic indicating the groove track, the second selection switch 88 connects the second inverter 84 to the second switch 90. Accordingly, an output signal of the limiter 80 is applied, via the second selection switch 88, to the second switch 90 in an inverted state. On the other hand, when the track identification signal LGID has a high logic indicating the land track, the second selection switch 88 connects the third buffer 86 to the second switch 90. In this case, the output signal of the limiter 80 is applied, via the second selection switch 88, to the second switch 90 as it is. The second selection switch 88 performs a switching operation at a time point when a logical state of the track identification signal LGID changes, that is, in the edge region. The second switch 90 is responsive to the area identification signal IUID output from the track and area identifier 18 to perform a sample and hold operation. More specifically, when the area identification signal IUID has a high logic indicating the ID area, the second switch 90 is opened to hold an output signal of the second polarity switching circuit 82 by means of a bandpass filter 92. On the other hand, when the area identification signal IUID has a low logic indicating the user information area, the second switch 90 connects the second polarity switching circuit 82 to the bandpass filter 92 to sample an output signal of the second polarity switching circuit 82 by means of a bandpass filter 92. The bandpass filter 92 eliminates a high frequency information signal that may be included in the output signal of the second switch 90, thereby detects only a wobbling component occupying a certain frequency band. The slicer 94 makes a level-slicing and logicalization of a wobbling component output from the bandpass filter 92 to output a wobbling signal wave-shaped in a rectangular Corm.

The recording channel clock generator 26 in FIG. 9 further includes a first phase comparator 96, a first integrator 98 and a voltage controlled oscillator(VCO) 100 that are connected to the slicer 94 in series, and a first frequency divider 102 connected between the VCO 100 and the first phase comparator 96. The first phase comparator 96 compares a phase of a rectangular wave wobbling signal from the slicer 94 with that of a clock signal from the first frequency divider 102 to generate a phase error signal having a voltage corresponding to the phase difference. The first integrator 98 integrates the phase error signal from the first phase comparator 96 and output it to the VCO 100. The VCO 100 controls an oscillation period in accordance with a voltage level of the phase error signal integrated by means of the first integrator 98 to generate a channel clock SCLK. The first frequency divider 102 frequency-divides the channel clock SCLK from the VCO 100 by a first predetermined number and outputs the frequency-divided channel clock to the first phase comparator 96. The channel clock SCLK generated at the VCO 100 is supplied to the recording information processor 28 to control a recording speed of the user information recorded on the optical disc 10. Then, the recording information processor 28 in FIG. 2 converts the input user information into a channel bit stream which is a recording pattern of the optical disc 10 and transfers the channel bit stream to the light controller 30 in conformity to the clock channel SCLK from the VCO 100. The light controller 30 intermits the laser diode LD included in the pickup 14 in accordance with the channel bit stream from the recording information processor 28 to record the user information on the land and groove tracks of the optical disc 10.

Moreover, the recording channel clock generator 26 includes a second frequency divider 106, a second phase comparator 108 and a second integrator 110 that are connected to a oscillator 104 in series. The oscillator 104 generates an oscillation signal having a certain frequency. The second frequency divider 106 frequency-divides an oscillation signal from the oscillator 104 by a second predetermined number and outputs the frequency-divided signal to a second phase comparator 108 as a reference signal. The second phase comparator 108 detects a phase difference between the oscillation signal frequency-divided by means of the second frequency divider 106 and the rectangular wobbling signal output from the slicer 94 and generates a phase error signal having a voltage corresponding to the phase difference. The second integrator 110 integrates the phase error signal from the second phase comparator 108 and provides the integrated phase error signal as a rotation error signal Cmo.

Referring to FIG. 2 again, the information recording and reproducing apparatus further includes a motor driver 36 for driving the spindle motor 12, and a controller 40 for controlling circuits within the apparatus. The motor driver 36 accelerates or decelerates a rotation speed of the spindle motor 12 in accordance with a voltage level of the rotation error signal Cmo from the second integrator 110 in FIG. 9 to keep the rotation speed of the optical disc 12 constant. The controller 40 drives any one of the recording information processor 18 and the reproducing information processor 34 in accordance with the recording or reproducing mode and controls the light controller 30 in such a manner that the light controller 30 controls an intensity of a light beam emitted from the laser diode LD. Also, the controller 40 controls the operations of the focus servo 22, the tracking servo 24 and the motor driver 36.

As described above, the information recording and reproducing apparatus according to the present invention can accurately identify the tracks and areas using the pushpull signal including an information on the ID area.

Also, the information recording and reproducing apparatus according to the present invention can perform an accurate tracking control for a recording medium having land and groove tracks and divided into the identification area and the user information area with the aid of an identified information for the tracks and areas. Accordingly, the information recording and reproducing apparatus according to the present invention is capable of accurately recording the user information on a recording medium having land and groove tracks and divided into the ID area and the user information area as well as accurately accessing the recording medium.

Although the recording and reproducing apparatus has been described as an embodiment of the present invention hereinbefore, it should be apparent to the ordinary skilled person in the art that a spirit of the present invention is applicable to an information recording-only apparatus and an information reproducing-only apparatus. Also, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A method of detecting a location on an optical medium, comprising:
   generating a difference signal from at least two photodetectors arranged perpendicular to a track direction;
   comparing the difference signal with a first reference voltage to generate a first signal;
   comparing the difference signal with a second reference voltage to generate a second signal;
   indicating a presence of a land track when the second signal has a high logic level and until the first signal has a high logic level; and
   indicating a presence of a groove track when the first signal has a high logic level and until the second signal has a high logic level.

2. The method of claim 1, wherein the first reference voltage corresponds to a zero crossing level of the first signal when the photodetectors are detecting light from a land identification area.

3. The method of claim 1, wherein the second reference voltage corresponds to a zero crossing level of the second signal when the photodetectors are detecting light from a groove identification area.

4. The method of claim 1, wherein the first signal has a high logic level when the difference signal is higher than the first reference voltage.

5. The method of claim 1, wherein the second signal has a high logic level when the difference signal is lower than second first reference voltage.

6. A method of detecting a location on an optical medium, comprising:
   generating a difference signal from at least two photodetectors arranged perpendicular to a track direction;
   comparing the difference signal with a first reference voltage to generate a first signal;
   comparing the difference signal with a second reference voltage to generate a second signal;
   outputting a pulse of a predetermined duration each time a triggering pulse is detected in the first and second signals to indicate a presence of an identification area when pulses are outputted and a presence of a user area when no pulses are outputted.

7. The method of claim 6, wherein the first reference voltage corresponds to a zero crossing level of the first signal when the photodetectors are detecting light from a land identification area.

8. The method of claim 6, wherein the second reference voltage corresponds to a zero crossing level of the second signal when the photodetectors are detecting light from a groove identification area.

9. The method of claim 6, wherein the first signal has a high logic level when the difference signal is higher than the first reference voltage.

10. The method of claim 6, wherein the second signal has a high logic level when the difference signal is lower than second first reference voltage.

11. The method of claim 6, wherein the predetermined duration is longer than a duration of a signal corresponding to a longest pit in the optical medium.

12. The method of claim 6, further comprising:
    indicating a presence of a land track when the second signal has a high logic level and until the first signal has a high logic level; and
    indicating a presence of a groove track when the first signal has a high logic level and until the second signal has a high logic level.

13. An apparatus for detecting a location on an optical medium, comprising:
    at least two photodetectors arranged perpendicular to a track direction to output electrical signals corresponding to incident light;
    an amplifier to generate a difference signal from the electrical signals;
    a first comparator to compare the difference signal with a first reference voltage and to generate a first signal;
    a second comparator to compare the difference signal with a second reference voltage and to generate a second signal;
    an RS flip flop connected to outputs of the first and second comparators to generate an output signal indicating a presence of a land track or a groove track.

14. The apparatus of claim 13, wherein the first reference voltage corresponds to a zero crossing level of the first signal when the photodetectors are detecting light from a land identification area.

15. The apparatus of claim 13, wherein the second reference voltage corresponds to a zero crossing level of the second signal when the photodetectors are detecting light from a groove identification area.

16. The apparatus of claim 13, wherein the difference signal is connected to a non-inverting input of the first comparator and an inverting input of the second comparator.

17. The apparatus of claim 13, wherein the output of the first comparator is connected to an R input of the RS flip flop, and the output of the second comparator is connected to an S input of the RS flip flop.

18. An apparatus for detecting a location on an optical medium, comprising:

at least two photodetectors arranged perpendicular to a track direction to output electrical signals corresponding to incident light;

an amplifier to generate a difference signal from the electrical signals;

a first comparator to compare the difference signal with a first reference voltage and to generate a first signal;

a second comparator to compare the difference signal with a second reference voltage and to generate a second signal; and a retriggerable multivibrater having a time constant determined by a resistor and a capacitor to generate pulses when triggered by the first and second signals to indicate a presence of an identification area when pulses are outputted and a presence of a user area when no pulses are outputted.

19. The apparatus of claim 18, wherein the first reference voltage corresponds to a zero crossing level of the first signal when the photodetectors are detecting light from a land identification area.

20. The apparatus of claim 18, wherein the second reference voltage corresponds to a zero crossing level of the second signal when the photodetectors are detecting light from a groove identification area.

21. The apparatus of claim 18, wherein the difference signal is connected to a non-inverting input of the first comparator and an inverting input of the second comparator.

22. The apparatus of claim 18, wherein values of the resistor and capacitor are such that the time constant is longer than a duration of a signal corresponding to a longest pit in the optical medium.

23. The apparatus of claim 18, further comprising:

an RS flip flop connected to outputs of the first and second comparators to generate an output signal indicating a presence of a land track or a groove track.

24. The apparatus of claim 23, wherein the output of the first comparator is connected to an R input of the RS flip flop, and the output of the second comparator is connected to an S input of the RS flip flop.

* * * * *